2,733,127

PRECIPITATION OF FLUORIDE-FREE URANIUM TETROXIDE

Louis Spiegler, Woodbury, N. J., assignor to the United States of America as represented by the United States Atomic Energy Commission No Drawing. Application January 6, 1945, Serial No. 571,674

6 Claims. (Cl. 23—14.5)

This invention relates to the manufacture of uranium peroxide. It is particularly concerned with the production of uranium peroxide of low fluorine content from uranium compositions containing magnesium and fluorine.

In the manufacture of metallic uranium by heating uranium tetrafluoride with magnesium, slags and drosses are formed containing substantial quantities of uranium together with magnesium and fluorine. The process is usually carried out in reaction chambers lined with lime and consequently calcium also is present in the by-products. In the recovery of uranium from such materials by conversion of the uranium to uranyl sulfate and subsequent precipitation of uranium peroxide from aqueous uranyl sulfate solution, as described and claimed in my U. S. patent application Serial No. 559,665 entitled, "Separation of Uranium From Mixtures," filed October 20, 1944, small quantities of magnesium and fluorine are precipitated along with the uranium peroxide. As a consequence the uranium peroxide may be contaminated with fluorine in an amount from a few tenths of one percent to two or three percent, depending upon the original fluorine and magnesium content of the uranyl sulfate solution. While the fluorine content may be reduced to an insignificant value by roasting the uranium-containing materials with sulfuric acid to expel the fluorine as hydrogen fluoride as described in my U. S. patent application Serial No. 559,667, entitled "Uranium Liberation," filed October 20, 1944, it is sometimes desirable to recover the product without employing a sulfuric acid roast. For example, in working up uranium-containing mixtures containing relatively small proportions of fluorine, the amounts of by-product hydrogen fluoride which can be recovered are not sufficient to offset the cost of recovery. For such materials a more economical process is desirable even though it does not involve direct formation of hydrogen fluoride.

An object of the invention is the production of uranium peroxide of low fluorine content from materials containing magnesium and fluorine as well as uranium. Further objects will be apparent from the following description.

In accordance with the present invention uranium peroxide is precipitated from an aqueous uranyl salt solution containing magnesium and fluorine in the the presence of a substantial quantity of dissolved boric acid. I have found that the boric acid exerts an inhibiting effect upon precipitation of fluorides from such solutions so that uranium peroxide can be precipitated while fluorine remains in solution. This action of the boric acid permits the recovery of uranium peroxide containing substantially less fluorine than products obtainable from the same composition in the absence of boric acid.

While the process is applicable to solutions containing as little as ½% of uranyl sulfate, I prefer because of practical considerations, to provide an aqueous uranyl sulfate solution between 3% and 16% by weight of uranyl sulfate and between $\frac{4}{10}$ and one mol of boric acid for each mol of uranyl sulfate, and having a hydrogen ion concentration corresponding to a pH between 2 and 4, and then to add sufficient peroxide in the form of hydrogen peroxide or alkali-metal peroxide to substantially completely precipitate the uranium content of the solution as the uranium peroxide. During or after the addition of the peroxide to the solution the hydrogen ion concentration is readjusted as necessary by the addition of an acid or alkaline reagent to restore the desired pH value. To avoid decomposition of uranium peroxide, I prefer to effect the precipitation at temperatures below 65° C.; and to secure large well-formed crystals, I prefer temperatures of at least 30° C. Since the inhibiting effect of the borate ions is not merely a temporary effect but a permanent one, there is no necessity for rapid handling of the solutions and a slow precipitation of the peroxide is permissible.

In the following examples proportions are in terms of weight unless otherwise indicated.

Example 1

A by-product material obtained in the manufacture of metallic uranium by treatment of uranium tetrafluoride with metallic magnesium was roasted in air at 850° C. for 16 hours, 65 parts of the product containing 19 parts of uranium in combined form was mixed with 200 parts of water; 42 parts of 96% sulfuric acid solution was added gradually, bringing the pH to 0.9; one-half part of sodium peroxide was added and the mixture was heated to 90–95° C.; 11 parts of calcium carbonate was added and the pH readjusted to 3.7 by the addition of about 4 parts of 96% $H_2SO_4$. The mixture was filtered hot, the filter-cake was reslurried with 350 parts of water, this slurry was filtered, and the two filtrates were combined. The combined solution contained 2 grams per liter of fluorine. Two parts of boric acid was added to the solution, 14 parts of an aqueous 28% solution of hydrogen peroxide was then added to convert uranium to the peroxide, and 15 parts of aqueous 30% NaOH solution was added to adjust the pH to 3.0. The product was filtered and the uranium peroxide residue was washed with 1050 parts of water and dried. The product comprised 27 parts of uranium peroxide containing 0.5% of fluorine.

When the same process is conducted without adding boric acid, a similar yield of uranium peroxide containing 2% of fluorine is obtained.

Example 2

To 300 cc. of a uranyl sulfate solution containing approximately 50 grams per liter of uranium and 0.37% of fluorine, obtained by a process of the type described in Example 1, 4 grams of boric acid was added and then 12 cc. of aqueous 28% $H_2O_2$ and 10.5 cc. of aqueous NaOH solution containing 400 grams per liter of NaOH. The precipitate of $UO_4.2H_2O$ was separated by filtration, washed with water, and dried. 21.5 grams of $UO_4.2H_2O$ containing 1.2% fluorine was obtained.

When the process is conducted in a similar manner, omitting the boric acid, a uranium peroxide product containing about 4.8% of fluorine is obtained.

Example 3

To 449 cc. of uranyl sulfate solution containing about 69 grams per liter of uranium and 0.12% of fluorine, obtained as previously described, 4 grams of boric acid was added and the solution was stirred for an hour at 40–45° C. 19 cc. of 28% $H_2O_2$ solution was then added at the same temperature, bringing the pH of the solution to 0.8. The pH was adjusted to 2.9–3.0 by adding 22 cc. of caustic soda solution containing 400 grams per liter of NaOH. The precipitate was filtered and washed as in Example 2. 44 grams of $UO_4.2H_2O$ containing 0.18% of fluorine was obtained.

Conduct of the process without the boric acid yields a peroxide product containing 1% or more of fluorine.

It will be understood that I intend to include variations and modifications of the invention and that the preceding examples are illustrations only and in no wise to be construed as limitations upon the invention, the scope of which is defined in the appended claims, wherein I claim:

1. In the recovery of uranium peroxide by precipitation from a uranyl salt solution containing magnesium and fluorine, the improvement which comprises effecting the uranium precipitation in the presence of borate ions and separating the precipitated uranium peroxide from the resulting mother liquor.

2. In the recovery of uranium peroxide by precipitation from uranyl sulfate solution containing magnesium and fluorine, the method of producing a uranium peroxide of low fluorine content, which comprises effecting the uranium peroxide precipitation from a solution containing a substantial quantity of borate ions.

3. In the recovery of uranium peroxide by precipitation from uranyl sulfate solution containing magnesium and fluorine, the method of producing a uranium peroxide of low fluorine content, which comprises effecting the uranium peroxide precipitation from a solution containing between about $4/10$ mol and about one mol of boric acid for each mol of uranyl sulfate, at a pH between 2 and 4 and at a temperature below 65° C., and separating the uranium peroxide from the resulting mother liquor.

4. The method of making uranium peroxide of low fluorine content from uranyl sulfate containing magnesium and fluorine, which comprises providing a uranyl sulfate solution containing between ½% and 16% of uranyl sulfate and between about $4/10$ mol and about one mol of boric acid for each mol of uranyl sulfate and having a pH between 2 and 4, adding sufficient peroxide to convert the uranium to uranium peroxide while maintaining the solution at a temperature below 65° C., and separating the uranium peroxide from the resulting mother liquor.

5. The method of making uranium peroxide of low fluorine content from uranyl sulfate containing magnesium and fluorine, which comprises providing a uranyl sulfate solution containing between 3% and 16% of uranyl sulfate and between about $4/10$ mol and about one mol of boric acid for each mol of uranyl sulfate, adding sufficient hydrogen peroxide to convert the uranium to uranium peroxide while maintaining the solution at a pH between 2 and 4 and at a temperature between 30° C. and 65° C., and separating the uranium peroxide from the resulting mother liquor.

6. The method of making uranium peroxide of low fluorine content from uranyl sulfate containing magnesium and fluorine, which comprises providing a uranyl sulfate solution containing between 3% and 16% of uranyl sulfate and between about $4/10$ mol and ½ mol of boric acid for each mol of uranyl sulfate and having a pH between 2 and 4 and a temperature between 30° and 65° C., adding sufficient hydrogen peroxide to convert the uranium to uranium peroxide and sufficient alkaline reagent to provide a final pH between 2 and 4, and separating the uranium peroxide from the resulting mother liquor.

No references cited.